March 11, 1958     J. G. SCHOTTHOEFER     2,826,124
METAL SLOTTING AND SHAPING DEVICE
Filed Nov. 2, 1955
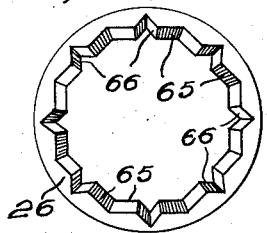
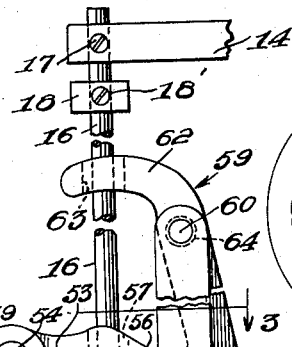
INVENTOR
Joseph G. Schotthoefer
BY James Askins
ATTORNEY

United States Patent Office 2,826,124
Patented Mar. 11, 1958

2,826,124

METAL SLOTTING AND SHAPING DEVICE

Joseph G. Schotthoefer, Detroit, Mich.

Application November 2, 1955, Serial No. 544,392

10 Claims. (Cl. 90—55)

This invention relates to a metal slotting and shaping device.

The invention is more particularly concerned with a device for slotting and shaping metallic work pieces, and which is generally characterized by a housing adapted for removable connection with a vertically and horizontally reciprocable power-driven ram, and wherein a toolholder supporting member is disposed within the housing.

Slot cutting and shaping devices now known generally comprise a reciprocable ram to which is connected by sundry means a cutting tool whose movements are wholly controlled by those of the ram, whereby same is confined to the same linear path of movement in both the cutting and retracting strokes thereof.

As is generally known, the cutting tool is of chisel form with a cutting edge at the juncture of one side wall and the beveled bottom wall thereof, and same in operation is advanced through the work in the formation of a slot or linear contour form, and is subsequently retracted therefrom.

In the retraction of the tool, it has been found that the bit or cutting edge thereof has a substantial frictional drag on the base of the slot or linear contour form, and that such condition results in undue wear on the bit with a resulting reduction in its cutting efficiency.

It is accordingly a primary object of the invention to provide a construction in a device of the character referred to wherein the bit of the cutting tool has none or only a very light drag on the work in its retracting stroke.

A further and more specific object of the invention is to provide a metal cutting device wherein a metal cutting tool is supported in the forward end of a member which is disposed within a power reciprocable member, and wherein a lost motion connection is provided between said members which is effective in the retracting stroke to provide slight movement of the tool in a direction normal to the line of reciprocation thereof.

In the advancing or operative stroke of the cutting tool, it is necessary that same be rigidly supported relative to said line of reciprocation for an effective cutting operation. It is accordingly a further object of the invention to provide cooperating surfaces on said members of frusto-conical form whereby said lost motion is provided upon separation of said surfaces and the positive drive of the tool is effected when said surfaces are in contact.

It is essential that the cutting tool be maintained in the same position relative to the axis thereof in its successive advancing strokes for efficient cutting operation. Accordingly, a further object of the invention is the provision of cooperating tongues and grooves on certain of said surfaces which are of wedge form in plan for maintaining said members in the same position relative to their axes in the advancing strokes thereof.

A still further object of the invention is the provision of yieldable means operative to maintain the said surfaces in contact.

A further object of the invention is the provision of automatically operable means for rendering said spring means ineffective during the retracting stroke of the cutting tool.

Other objects and advantages of the invention will become apparent in the course of the following detailed description taken in connection with the accompanying drawing, wherein:

Figure 1 is a view partly in vertical section and partly in elevation with the upper portion thereof broken away and foreshortened and showing the device in accordance with a preferred structural embodiment thereof.

Fig. 2 is an elevational view on a substantially smaller scale than Fig. 1 and showing the improved device in operative association with a power-operated column or ram.

Fig. 3 is a horizontal view as observed in the plane of line 3—3 on Fig. 1.

Fig. 4 is a horizontal sectional view as observed in the plane of line 4—4 on Fig. 1.

Fig. 5 is a view of the cutting tool as observed from the lower end thereof.

Fig. 5-A is a view corresponding to Fig. 5 and showing a modified form of cutting tool.

Fig. 6 is a plan view of one of two cooperating rotation-restraining rings embodied in the device.

Referring now in detail to the drawing, the numeral 10 designates a housing which embodies opposed lateral flanges 11, each of which is provided with a pair of apertures 12 for receiving screw bolts 13 (Fig. 2) by which the improved device is removably secured to a block B disposed at the lower end of a ram R which has vertical slidable connection with a column C such as disclosed in U. S. Patent No. 2,360,520. The present invention is wholly applicable to the power structure of said patent except for a modification of the bracket 17 included therein and which is replaced by a bracket 14.

The housing 10 is provided with a vertical aperture 15 in which is co-axially disposed the lower end portion of a rod 16 whose upper end is secured in the bracket 14 as by means of a screw 17. The rod 16 is provided with an abutment 18 adjacent the bracket 14 and a second abutment 19 in substantial spaced relation to the abutment 18 for a purpose later to appear. The housing 10 is further provided with a relatively large cylindrical bore 20 which opens through the lower end of the housing.

The lower end portion of the wall of the bore 20 is threaded as indicated at 21 for threaded reception of an externally threaded sleeve 22 and the sleeve is maintained in any adjusted position by means of a lock-nut ring 23 which in locked position bears on the lower end of the housing 10.

The lower end of the sleeve 22 is provided with a cylindrical flange 24 which has a frusto-conical inner wall 25 for a purpose later to appear.

An outer rotation restraining ring 26 is supported on a horizontal shoulder 27 which defines the upper end of bore 20 and the housing is provided with a second bore 28 which extends from shoulder 27 to the upper end of the housing through which it opens. The bore 28 is of substantially less diameter and length than bore 20, and is co-axial therewith.

A sleeve 29 is removably supported in the bore 28 as by means of a set screw 30 and same is provided with an inwardly directed flange 31 at its lower end. Loosely disposed within the bores 20 and 28 is a tool bar supporting member 32 which is provided with a relatively long vertical bore 33 which opens through the lower end thereof, and the reduced shank portion 34 of a tool bar 35 is removably secured in the bore as by means of a set screw 36.

The lower end of the member 32 through which set screw 36 extends is provided with an external frusto-conical wall 37 in cooperative relation with the frusto-conical wall 25.

The lower end portion of the tool bar 35 is radially enlarged providing with shank portion 34 a horizontal shoulder 35' which engages the lower end wall of member 32.

The lower radially enlarged end of the tool bar 35 is provided with a rectangular recess 37a in which is removably supported the rectangular base end 38 of a cutting tool which includes an elongated portion 39 of the cross-sectional configuration indicated in Fig. 5, which is applicable to the formation of keys and splines.

The tool is retained in recess 37 by means of set screws 37' as indicated in Fig. 4. The tool according to Fig. 5-A corresponds fully to that shown in Figs. 1 and 5 with the exception that same is provided with a round nose for cutting curved contours.

As is indicated in Fig. 1, the cutting tool is disposed at an acute angle to the vertical and a cutting edge 40 is provided at the junction of a vertical edge 41, and the lower end 42 which is in acute angle relation to the edge 41 for a purpose later to appear.

The member 32 is diametrically reduced adjacent its upper end with the provision of an upwardly facing horizontal shoulder 43 on which is supported an inner rotation restraining ring 44 for cooperation with the ring 26.

The solid reduced cylindrical portion 45 of member 32 which is surrounded by ring 44 is further diametrically reduced in the provision of a relatively small diameter post 46 which extends through the sleeve 29 co-axially thereof and normally terminates above the upper horizontal wall of housing 10.

A coil spring 47 is disposed within the sleeve 29 with its lower end resting on flange 31 and a disk 48 is secured on the upper end of post 46 in contacting relation to the upper end of the spring by means of a screw bolt 49 having a rounded head 50.

A pair of brackets 51 are secured to the top of housing 10 and which include opposed spaced ears 52 and a lever 53 is disposed between the ears and pivotally supported intermediate its ends on a pin 54 which extends through the ears. One end of the lever 53 is provided with a convex surface 55 engageable with the rounded head 50. The opposite end of the lever comprises a pawl engageable nose 56 and the lever adjacent said nose is provided with an elongated vertical aperture 57 through which rod 16 extends.

A second pair of brackets 58 are secured to the top of housing 10 and a double-ended generally vertically disposed pawl 59 is disposed between the brackets 58 and pivotally secured thereto intermediate its ends as at 60.

The pawl 59 includes a lower finger 61 and an upper finger 62 and which latter finger is provided with an elongated vertical aperture 63 through which the rod 16 extends.

The pawl 59 is preferably biased clockwise as by means of a spring 64 surrounding the pivot 60 and having an end thereof connected to the pawl.

As will hereinafter more definitely appear, the tool bar supporting member 32 has limited axial movement relative to its supporting housing 10 and since it is essential that such member retain a fixed position circumferentially of its axis on the working stroke, the rings 26 and 44 have cooperating notches whose walls are inclined to the axis of the member, and while such notches may result from various configurations of the inner and outer walls of the respective rings 26 and 44, the rings are preferably formed as shown in Fig. 6 wherein the outer ring 26 has a generally serrated inner wall including octagonal portions 65 which portions are centrally intersected by notches 66 which will, of course, receive similarly formed teeth on the inner ring 44.

Having described the detail structure of the preferred form of the device, the operation thereof is as follows:

As is shown in Fig. 1, the housing 10 with its associated elements has almost reached the limit of its down stroke as is evidenced by the cut being made in the work W.

Since the rod 16 is fixed as is also the lower abutment 19 the right hand end of lever 53 will engage the abutment at about the time the slot in work W is completed which, due to continued movement of the housing, will cause lever 53 to rotate counter-clockwise, whereby the surface 55 will urge member 32 downwardly against the action of spring 47 and the frusto-conical surfaces at both ends of member 32 will separate slightly for corresponding movement of member 32 normal to its axis. When the lever is rotated, it will be obvious from Fig. 1 that finger 61 will swing in under nose 56 of the lever 53 and thereby hold member 32 in its free swinging retracted position and the cutting edge 40 of the cutting tool will move vertically free of or at least with very light drag on the work.

When the housing has reached the end of its retracting stroke the finger 62 on pawl 59 will engage the upper abutment 18 which will cause the pawl to rotate counter-clockwise with a resulting release of finger 61 from the nose 56 of the lever 53 and the spring 47 will again act to move the frusto-conical surfaces into contact whereby the housing 10 and member 32 will act as a rigid body in the advancing stroke thereof.

At this point, it is to be observed that the abutments 18 and 19 are adjustably secured to rod 16 as by means of set screws 18' and 19', respectively, for variable length cutting strokes.

While smooth frusto-conical surfaces will sufficiently relieve member 32 for the purpose set forth, it is essential that the member be in the same circumferential position on all successive cutting strokes thereof for proper position of the cutting tool edge, and such is effected by the structure of rings 26 and 44 and conical surfaces 37 and 25 and the positive simultaneous engagement thereof.

It is to be observed that the tool portion 39 in its operative position as in Fig. 1 is disposed at an acute angle to the vertical and that the lower edge 42 is disposed at an acute angle to the forward edge 41. This structure provides ample cutting clearance as well as clearance for the chips c with a minimum of sharpening required.

Having set forth my invention in accordance with a preferred structural embodiment thereof, what I claim and desire to secure by U. S. Letters Patent is:

1. A slotting and shaping device comprising a reciprocating housing having limited advancing and retracting strokes toward and from work to be operated on, a vertically elongated tool bar supporting member disposed within said housing with the upper end thereof projecting through the housing, and cooperating means on said housing and said tool bar supporting member adjacent the upper and lower ends of the latter operative upon reciprocation of said housing for providing a rigid thrust connection between said housing and said member in the advancing strokes thereof, and means swingably supported on said housing and being engageable with said upper end of said supporting member for positively displacing same axially relative to said housing and providing slight relative lateral movement between the housing and the member in the retracting strokes thereof.

2. A slotting and shaping device comprising a housing adapted for removable connection to a ram having vertical reciprocation on a column, said housing having a cylindrical walled bore therein and opening through the lower end thereof, a cylindrical tool bar supporting member disposed within said bore, vertically spaced bearing surfaces between said housing and said member adjacent the upper and lower ends thereof, said bearing surfaces being disposed in upwardly converging relation, yieldable means disposed within said housing normally urging said surfaces into contact for rigid co-axial movement of the housing and member in the advancing strokes thereof, and cooperating means on said column and said housing automatically operative to compress said yieldable means for slightly separating said surfaces in the retracting strokes of said housing and member.

3. The structure according to claim 3, wherein said member is provided with a disk on the upper end thereof, externally of the housing, said yieldable means comprising a coil spring having opposite ends thereof bearing on said housing and said disk, for normally urging the member upwardly within the housing with said surfaces in contact, and said last means comprising a two-armed lever pivotally supported on the upper end of said housing, a pair of vertically spaced abutments, the lowermost abutment being engageable with one arm of said lever for moving the other arm thereof inwardly against the action of said spring at the end of each advancing stroke, and means operative to lock said lever in said position, said last means being engageable with the uppermost abutment at the end of each retracting stroke for releasing said lever and restoring said spring to its normal action.

4. The structure according to claim 3, wherein said abutments are adjustably supported on a fixed vertical rod, and said housing being provided with a vertical aperture for receiving said rod and said lowermost abutment.

5. The structure according to claim 2, wherein the said lower bearing surfaces are of frusto-conical form and said upper bearing surfaces are of frusto-pyramidal form, and having a notch in each of the surfaces.

6. The structure according to claim 2, together with a cylindrical tool bar removably supported in the lower end of said member, a recess of rectangular form in cross-section opening through the lower end of said bar with the axis thereof in acute angular relation to the axis of the bar, and a cutting tool having a base end of rectangular form in cross-section and of less dimensions than said recess, and a pair of set screws threaded into said bar with their inner ends engaged with adjacent sides of said tool base end.

7. The structure according to claim 6, wherein said cutting tool comprises an elongated portion projecting from said base end, said elongated portion having parallel side walls in equi-angular relation to the walls of said rectangular base end, and said elongated portion having a front wall and an end wall in acute angular relation to said front wall and providing a cutting edge at the intersection thereof.

8. The structure according to claim 7, wherein said front wall is plane and in right angular relation to said side walls, thereby providing a straight cutting edge.

9. The structure according to claim 7, wherein said front wall is transversely convex, thereby providing a curved cutting edge.

10. A slotting and shaping device comprising a reciprocating housing having limited advancing and retracting strokes toward and from work to be operated on, a vertically elongated tool bar supporting member disposed within said housing, and cooperating means on said housing and said tool bar supporting member adjacent the upper and lower ends of the latter operative upon reciprocation of said housing for providing a rigid thrust connection between said housing and said member in the advancing strokes thereof, and means for positively displacing said member and providing slight relative lateral movement between the housing and the member in the retracting strokes thereof, said housing being provided with a bore in which said member is disposed, said last means comprising a lever pivotally supported intermediate its ends on said housing, one end of said lever being engageable with the upper end of said member, and an abutment in the path of movement of said housing and being engaged by the other end of said lever upon downward movement of said housing with resulting downward movement of said one end of the lever.

References Cited in the file of this patent

UNITED STATES PATENTS

| | | |
|---|---|---|
| 1,363,587 | Hanson | Dec. 28, 1920 |

FOREIGN PATENTS

| | | |
|---|---|---|
| 263,169 | Germany | Aug. 2, 1913 |
| 307,914 | Germany | Sept. 24, 1918 |
| 313,480 | Germany | July 17, 1919 |

U. S. DEPARTMENT OF COMMERCE
PATENT OFFICE
CERTIFICATE OF CORRECTION

March 11, 1958

Patent No. 2,826,124

Joseph G. Schotthoefer

It is hereby certified that error appears in the printed specification of the above numbered patent requiring correction and that the said Letters Patent should read as corrected below.

Column 5, line 5, for the claim reference numeral "3" read -- 2 --.

Signed and sealed this 22nd day of April 1958.

(SEAL)
Attest:
KARL H. AXLINE
Attesting Officer

ROBERT C. WATSON
Commissioner of Patents